Patented Feb. 20, 1940

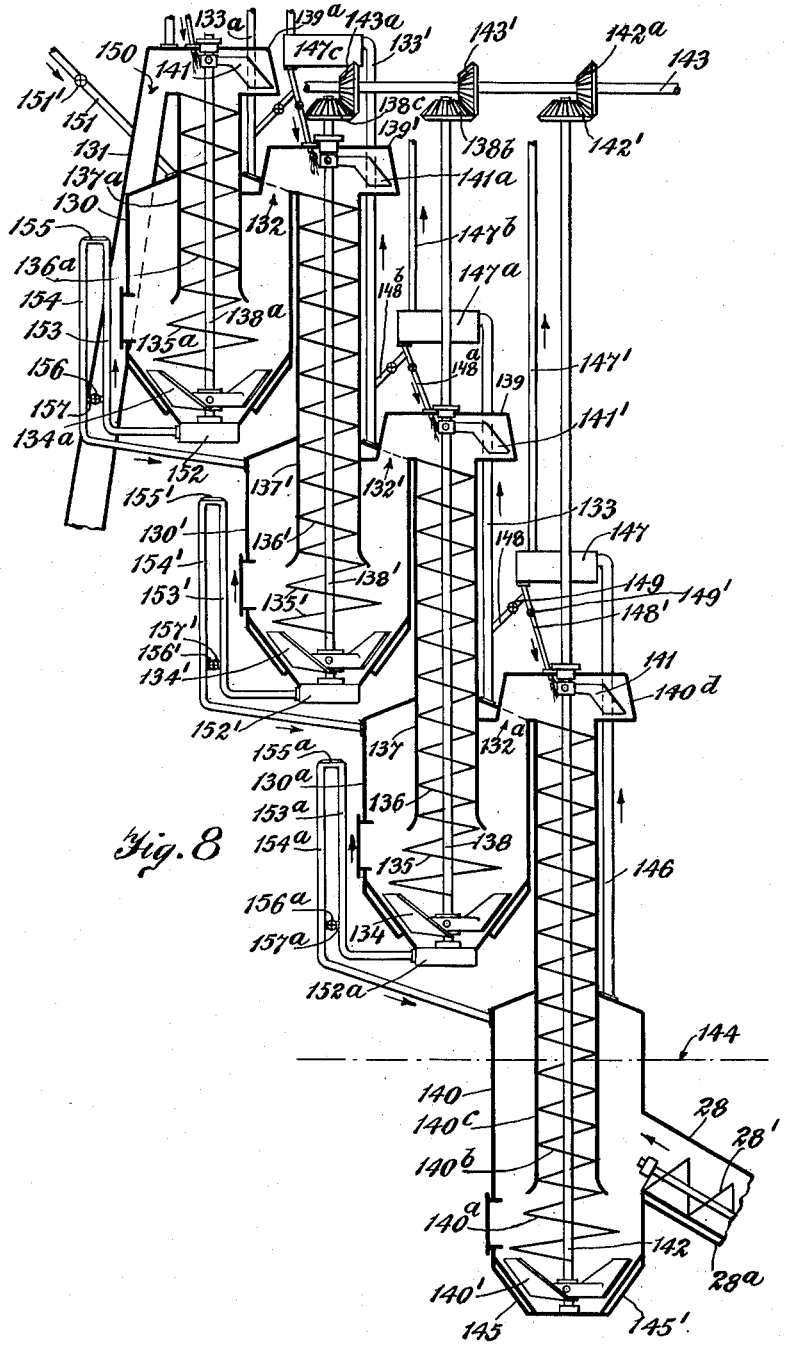

2,191,255

UNITED STATES PATENT OFFICE 2,191,255

PROCESS IN CONTINUOUS EXTRACTION SYSTEMS OF CONTINUOUSLY REMOVING FROM SOLVENT-TREATED MATERIALS, SOLVENTS OF LOWER SPECIFIC GRAVITY

Michele Bonotto, Evansville, Ind., assignor to Extractol Process, Ltd., Wilmington, Del., a corporation of Delaware Application November 16, 1934, Serial No. 753,266
Renewed July 11, 1939

2 Claims. (Cl. 34—24)

This invention relates to improvements in processes in continuous extraction systems of continuously removing from solvent-treated materials, solvents of lower specific gravity.

In oleaginous or oil-bearing materials, such as cotton seed, soya beans, tung nuts, linseed, castor beans, copra, bone meal, meat scraps and the like, the oil constituents are contained in cells and the cells are surrounded by membranes or tissues and it has been found that when these oil-bearing materials are subjected to the action of a suitable solvent or diffusion agent under proper conditions, these membranes in some cases will act like semi-permeable diaphragms to permit the osmotic discharge of the oil constituents from the cells, while in other cases, such membranes or films will act like permeable diaphragms to permit diffusion to take place between said oil constituents and the solvent or diffusion agent and in either case enabling the extraction of the oil constituents from the cells and enabling osmotic discharge or diffusion and consequent extraction of the oil constituents from the cells.

In order to extract from these cells through such membranes or diaphragms a maximum quantity of the contained oily material with a minimum quantity of the diffusion agent or solvent and to promote the osmotic discharge or diffusion of oily constituents through such membranes, the diffusion agent or solvent employed should be preferably applied to the material in counter current, i. e., fresh solvent or diffusion agent having maximum strength should be applied to outgoing material from which a part of the oil has theretofore been extracted and used solvent or diffusion agent of less strength should be applied to the fresh or incoming material and the diffusion agent or solvent should be thoroughly intermingled and kept in intimate contact with the mass of oil-bearing material for a time period sufficient to enable such osmotic action or diffusion to take place as distinguished from a mere washing operation. The determination of the length or duration of this time period will depend upon the type of material being treated, the condition of such material, the strength of the diffusion agent or solvent and other factors, such as the temperature maintained.

In general terms, my invention contemplates the feeding at one end of suitable apparatus and the continuous passage of the oil-bearing material in one direction through a series of successive units, the feeding of a solvent or diffusion agent in a direction opposite to the feed of the oil-bearing material, the arrangement of such units and/or the provision of means therein to subject the material in a plurality or series of steps or stages to the action of solvent or diffusion agent, the time period of contact of which may be regulated.

More particularly my invention contemplates the initial feeding of the oil-bearing material, which has previously preferably been flaked or crushed in any conventional manner, through a hopper into a vertically disposed tank where such material is subjected to the washing or percolating action of a solvent which preferably comprises gasoline which has been passed through the system in the opposite direction and in such passage has been enriched with oil. This solution partially fills the percolator tank and is caused by suitably applied heat or by a pump to percolate or circulate from the bottom thereof to the upper part of the tank. From the bottom of the percolator tank, the washed or percolated material is conveyed preferably by means of a perforated screw conveyor through a suitable conduit, preferably arranged in inclined position, to a vertically disposed main solvent-heating chamber within which chamber the material is thoroughly agitated and intimately intermingled with the solution. In this main heating chamber, part of the solvent is driven off by heat through suitable outlet pipes to a condenser and then subsequently employed as solvent in the system. The oil-bearing material is carried from the said main heating chamber upwardly by a vertically disposed screw conveyor to a connected or communicating vertically disposed extraction unit into which communicating unit said material may, when readily pulverizable materials are being treated, be lifted and dropped by gravity through an upper part thereof or may be forcibly fed through the bottom thereof when tougher materials are being treated. I preferably provide for a series of these extraction units and in either type I provide for the subjection of the material in each extraction unit to the diffusion agent for a time period which will enable the most effective extraction at the particular stage of my process represented by that unit, and the removal of such diffusion agent from contact at the end of such time period.

The material is fed from the uppermost extractor unit into an initial solvent-heating chamber and is, in said chamber, again thoroughly intermingled with fresh liquid solvent coming from the supply reservoir. Thereafter, it is carried upwardly a part of the distance of travel, through a perforated drum by a conveyor screw and pushed the balance of the distance of travel into a final vapor treating chamber wherein the material is treated with vaporized solvent from the said initial solvent-heating chamber. The said material is then dried by heat to drive off solvent and then subjected to steam vapor jets. In continuous extraction systems for the purpose of extracting oils from such oil-bearing materials, one type of which I shall show and describe, the solvent employed is preferably of lower specific gravity than the solvent-treated materials, and such solvent-treated materials are thereafter continuously subjected to a process or processes for the removal of the solvent therefrom. In such solvent-removing sections of the extraction systems, a part of the solvent is usually first removed in an indirect heater and in some systems the material is then subjected to direct steam treatment.

An object of this invention is to provide a novel method or process of direct-steam treatment for the removal of such solvent from the treated materials by the continuous conveyance, in an upward direction, through a plurality of superposed steam-injection zones, of treated material containing traces of solvent and the subjection of such material in such superposed zones during such movement thereof to the solvent-entraining action of jets of steam, said steam jets being heated progressively and increased to higher degrees of temperature for each successive zone above the preceding zone, beginning at the lowermost zone and rising upwardly, whereby successive particles of solvent are entrained at successively higher zones. The solvent-exhausted material is then continuously discharged and the steam and entrained solvent are continuously carried off above the discharged material. Preferably the conveyance of solvent-treated material through the superposed zones as hereinabove described is done in a true vertical direction while the jets of steam are being injected. In continuous systems, such solvent-heated material, preferably as it comes from the extraction section of the systems, is conveyed by conveyor screws through a steam-jacketed dryer in which it is subjected to an initial drying operation and is then passed through a vertically disposed solvent eliminating tank in which it is carried upwardly a part of the distance of travel, by a vertically disposed conveyor screw then pushed the balance of said distance and subjected to the action of steam injected into and through said material by a series of steam jets spaced from each other and preferably injecting steam at progressively higher temperatures to avoid condensation, steam from which is caused to come into intimate contact with the previously dried material. These steam-vapor jets carry off with them any solvent vapor and without condensation of steam eliminate the final traces of solvent which has not been removed by the drier. From this tank the material is passed downwardly through an outlet chute having a sampler tube.

With these and other objects in view, the invention comprises the combination of elements and arrangement of process steps so combined as to co-act and cooperate with each other in the performance of the functions and the accomplishment of the results herein contemplated.

Fig. 8 is a view of a modified form of a series of extractor units.

Figure 1:
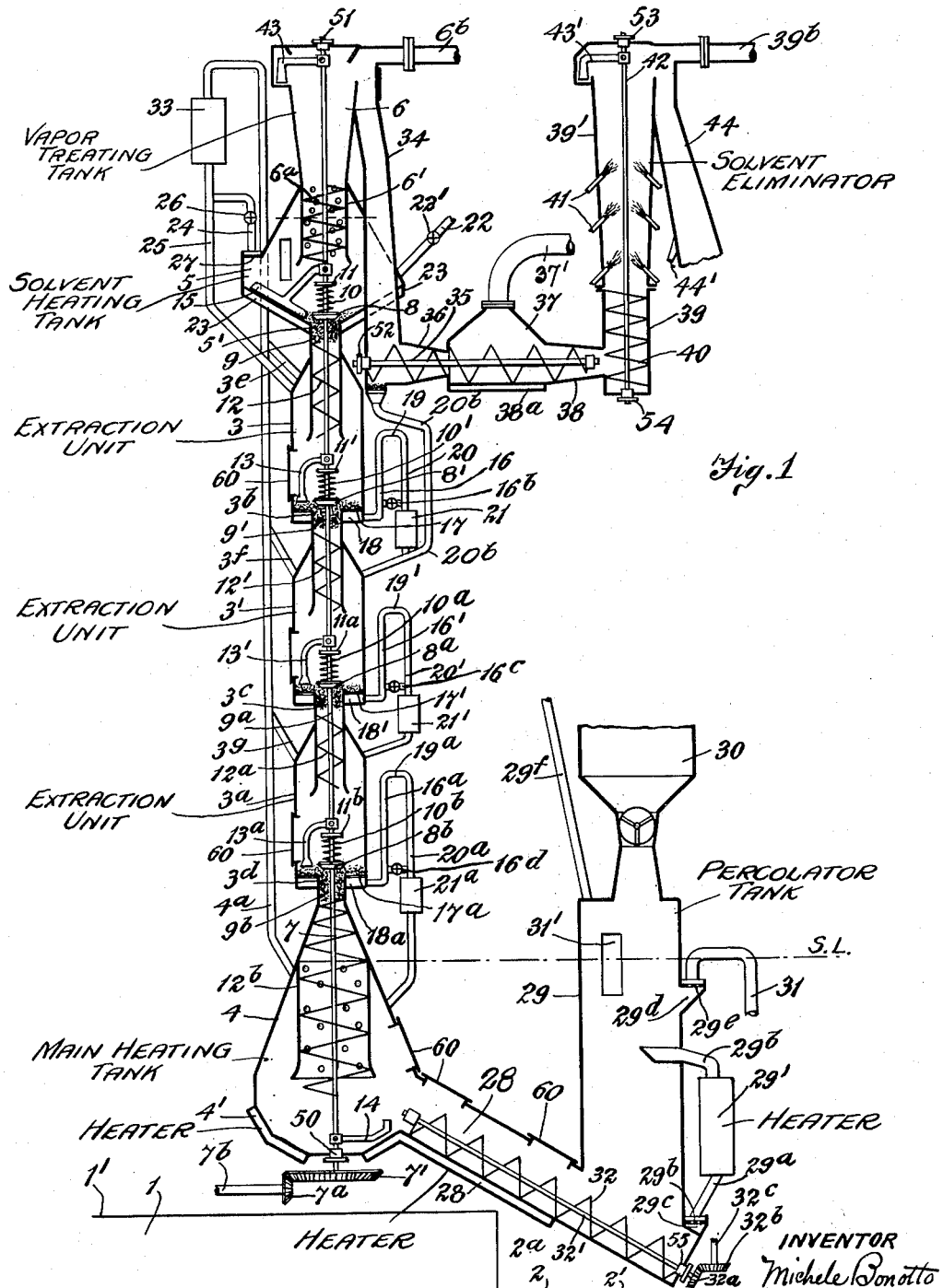
Fig. 1 is a diagrammatic view of a system of elements embodying my invention.

Referring now to Figs. 1, 2, 6 and 7 of these drawings, which illustrate diagrammatically an embodiment of my invention for use in treatment of materials which are not readily pulverizable, 1 indicates a suitable support having a ground line 1' and 2 is a depressed support having a ground line 2' and providing a pit 2ª. In accordance with the preferred form of my invention shown, I support in any suitable conventional manner upon a suitable support such as the ground 1' a series of vertically aligned units including solvent-heating, material treating and extraction units. This series of aligned units is connected at the bottom thereof by means of a downwardly inclined conduit with another vertically-disposed percolator unit and the upper end of said series is connected with a horizontal material-drier which connects with a vertical solvent-eliminator. I thus provide separate vertically disposed inlet and outlet tanks and a series of vertically disposed treating tanks which form the body of my apparatus.

In the embodiment illustrated in said Figs. 1, 2, 6 and 7 I provide, in vertical axial alignment, a series of three periodically siphoned extractor units 3, 3' and 3ª which constitute an important part of my invention. They communicate or are connected as shown with each other and also communicate at one end of said series with a main heating tank or retort 4 also positioned in vertical axial alignment and at the other end they are connected with an initial solvent heating tank 5 also in vertical alignment and which in turn communicates with a vapor percolator tank 6 arranged in similar alignment. As illustrated, I extend through the vertical axis of the entire series of these tanks a shaft 7 which is adapted to be slowly rotated, as shown, by gears 7', 7ª and shaft 7ᵇ from any suitable source of power not shown.

The form of extracting units 3, 3' and 3ª of said Figures 1, 2, 6 and 7 communicate with each other and with the units 4 and 5 by means of restricted conduits or neck portions 3ᵇ, 3ᶜ, 3ᵈ and 5' respectively. The upper ends of each of said conduits are, at the beginning of operation, closed by spring-pressed valves 8, 8', 8ª and 8ᵇ, and conveyor mechanisms are provided below such restricted connecting conduits to force material upwardly against said valves and to compress the same at the upper end of said connecting conduit so as to form in each of such conduits plugs of compressed material 9, 9', 9ª and 9ᵇ which are impermeable to the liquid solvent used. As illustrated, the valves 8, 8', 8ª and 8ᵇ are resiliently pressed downwardly by springs 10, 10', 10ª and 10ᵇ which extend between the said valves and adjustable plates 11, 11', 11ª and 11ᵇ, the arrangement being such that any suitable desired pressure may be exerted against said valves. In the embodiment shown, I provide on the shaft 7 conveyor-screws 12, 12', 12ª and 12ᵇ for conveying and forcing the material upwardly into and through said restricted communicating conduits and into contact with the valves 8, 8', 8ª and 8ᵇ. These conveyor-screws cause the material to be squeezed to substantially free the same from solvent absorbed during passage of such material through such solvent in a unit or tank and also produce or form under the pressure of the valves 8, 8', 8ª and 8ᵇ liquid-impermeable sections of compressed material which provide continuously renewable plugs of such material for each of the succeeding units, and plug up or stop the passage or flow of liquid through this plugged section, thus enabling each of such units above said impermeable plug to independently contain and hold a liquid solvent for the purpose hereinafter more particularly described.

Each of the extracting units 3, 3' and 3ª are provided with agitators 13, 13', 13ª and the main and initial solvent heating tanks 4 and 5 are also provided with agitators 14 and 15. All of these agitators are adjustably mounted upon the axially disposed shaft 7.

An important part of my invention resides in providing means for gradually filling the extractor tanks with solvent to a predetermined depth and the periodic emptying of such units. In the axially disposed units hereinabove described, which as aforesaid are suitable for use with material which is not readily pulverizable, the impermeable plugs of material hereinabove described forms a closure between the tanks, enables the gradual filling of such units with solvent supplied in any suitable manner. For the purpose of emptying such units of solvent after enrichment with oil, I preferably provide each of the units with siphoning-columns or tubes 16, 16' and 16ª communicating at one end with the bottom portion of said units 3, 3' and 3ª. As shown, I provide in the bottom of said units filtering elements 17, 17' and 17ª which comprises a filtering medium such as hair cloth held in place by perforated plates, but the real filtering agent comprises the layer of material above the hair cloth and the thickness of the bed of material may be regulated by the adjustment of the scraper 13, 13', 13ª, this bed of material being thus variable in accordance with the type of material being treated and, as shown, are preferably located between the extraction compartments 18, 18' and 18ª and filter compartments to which latter compartment the siphoning columns 16, 16' and 16ª are connected. At the top of the siphoning-column tubes or conduits, I preferably provide sight glasses 19, 19' and 19ª to enable examination particularly as to color of the liquid solution passing through the siphon tubes. The siphoning members 16, 16' and 16ª are, as illustrated, connected with conducting pipes 20, 20' and 20ª, which connect with the next succeeding unit below and conduct the siphoned solution to such next succeeding unit. In the form illustrated, I provide intermediate the ends of each of said conducting pipes 20, 20' and 20ª, heaters 21, 21' and 21ª adapted to heat the solution during its passage through said pipes 20, 20' and 20ª.

The valve 22' may be used to regulate the supply of solvent and, in combination with the siphoning column, may be used to regulate the time period of contact of the solvent with the material, i. e., the time period that is required to fill the unit to the level of the top of the siphoning column. It is desirable that the timer period of contact in each unit be independently regulated and for this purpose I provide regulatable by-pass pipes 16ᵇ, 16ᶜ and 16ᵈ by manipulation of the valves of which the time periods for each of the extractor units may be regulated independently of the other by by-passing a portion of the liquid before it reaches the siphoning level.

In the embodiment shown, solvent is supplied to the initial solvent-heating tank 5 at the top of the series through a supply pipe 22 connected with any suitable source of supply. This supply pipe is provided with a regulating valve 22' so that the supply of solvent may be suitably regulated. The tank 5 is provided at its bottom portion with a steam chest or heater 23 and is preferably partially filled with fresh solvent which may be heated by the heaters 23 and forced through a pipe 24 into the main solvent-supply pipe 25 which is connected with and supplies solvent to the uppermost extractor 3. It is also desirable in said initial solvent-heating chamber to provide gaseous vapors for the purpose of further treating the material in the container 6 therewith and I therefore preferably initially heat the material to the boiling point of the solvent. Thus vapors of the solvent will pass upwardly through the perforated drum 6' into the inversely tapered tank 6 and hot liquid solvent may be forced through the pipe 24 to the main supply pipe 25 from which the solvent is as aforesaid, delivered at such rate as may be desirable and determined upon. The pipe 24 is preferably provided with a regulating valve 27 for the purpose of regulating pressure within the container 5 and the strainer or filter 27 is provided between said pipe 24 and the connection thereof with the container 5.

Material is fed into the container 4 at the bottom thereof by the screw conveyor 32 in inclined conduit 28 the lower end of which is connected with a vertically positioned percolator tank 29. The tank 29 is provided at its upper end with a suitable feed hopper 30 and a sight-glass 31', a solution outlet-arm 31 of U-shape being provided near the top of said tank 29 and extending upwardly so that the supply of solvent solution provided in this tank will extend up to the dotted line SL. The material fed through the hopper 30 is deposited in the tank 29, and passing downwardly to the bottom thereof is picked up by the conveyor-screw 32 which is mounted as shown on a shaft 32' and rotated by means of pinions 32ª and 32ᵇ through a shaft 32ᶜ from any suitable source of power not shown. The material is moved by the screw-conveyor 32 upwardly into the bottom of the main solvent-heating tank 4 as aforesaid, in which tank the material and solvent are agitated and intermingled through the rotation of the agitator 14. This main solvent-heating tank 4 is provided at its bottom portion with a steam chest 4' and a communicating steam chest 28' extends along the bottom portion of the conduit 28. In said tank 4, the solvent solution is brought to the boiling point and a portion thereof is vaporized and passes through the pipe 4ª upwardly to a solvent-condenser 33, where it is condensed and passed to the main solvent supply pipe 25.

Heating of this solution in this container or tank increases the solvent strength of the solvent, concentrates the solution passing downwardly through the conduit 28 and also causes the passage through the pipe 4ª of solvent vapor which is subsequently condensed to provide an additional free supply of solvent to the system or series of extractors. By the word "solution" we mean the solvent enriched or partially enriched with oil.

Each of the extractors also have at their upper ends pipes $3^e$, $3^f$ and $3^g$ connected with the pipe $4^a$ and through that pipe with the condenser so that any vapors from such extractor units will be carried to the condenser and condensed.

The upper end of the vertical series of extractor and treatment units is connected by a vertically disposed material conduit 34 which deposits the material on a horizontally disposed conveyor-screw 35 in a horizontally disposed conduit 36 which may if desired be inclined and which communicates with one end of a drier 37, the opposite end of the drier communicating through a conduit 38 with another vertically disposed tank 39 having mounted at its bottom portion a conveyor-screw 40 adapted to force material upwardly through an upper outwardly divergent portion 39', through the walls of which are passed a series of steam-jet nozzles 41 from which superheated steam is adapted to impinge against the material conveyed or passing upwardly in said section. Progressively heated to higher degrees of temperature, the steam of these jets will entrain and carry with it any traces of solvent which remain after treatment in the drier 37. In this tank, the conveying-screw is mounted upon an axially disposed shaft 42 and an agitator 43 is provided at the upper end of said tank for the purpose of forcing material coming in contact therewith into the delivery conduit 44 which may be connected at its lower end to any suitable outlet and as shown this outlet conduit is provided with a small sampler tube 44'.

It is desirable that the solvent solution in the tank 29 be heated and for this purpose I preferably provide a heater 29' on the outside of said tank and cause a circulation through said heater. This circulation through the heater may be obtained by a pump, if desired and passes by means of the pipes or conduits $29^a$ and $29^b$ respectively, a suitable filter $29^b$ being provided between the pipe $29^a$ and connecting elbow $29^c$ extending from the tank 29.

The solvent solution enriched with oil is passed from tank 29 through elbow $29^d$, a strainer or filter $29^e$ and to the outlet pipe 31, after which it is treated for separation of the oil from the solvent by any well-known method.

Figure 2:
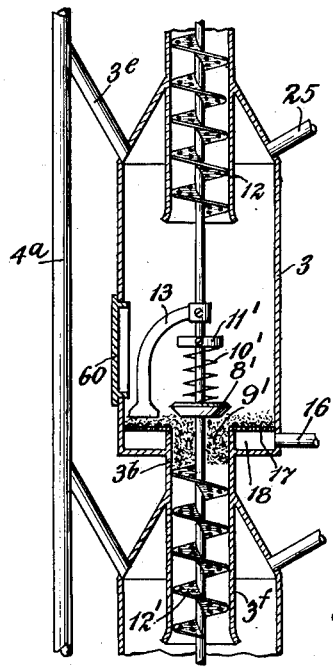
Fig. 2 is an enlarged sectional view of one of my extractor units and adjacent parts.
Figure 3:
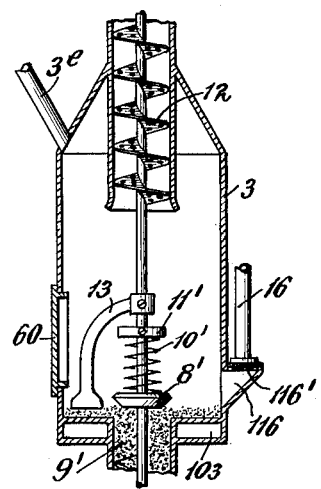
Fig. 3 is an enlarged section of a modified form of extractor unit which may be employed in my invention.

In Fig. 2 I have shown an enlarged view of an extractor unit similar to those illustrated in Fig. 1, and in Fig. 3 I have shown a modified form of extractor unit which is in all respects similar to the unit shown in Figs. 1 and 2 except that instead of connecting the siphoning column to a filter compartment at the bottom of the unit, this siphoning column is connected with a side elbow 116 having at its upper end a filter member 116' and said unit is also provided at its lower end with a steam chest or heating element 103. In other respects the construction is identical with that shown in Figs. 1 and 2.

Figure 4:
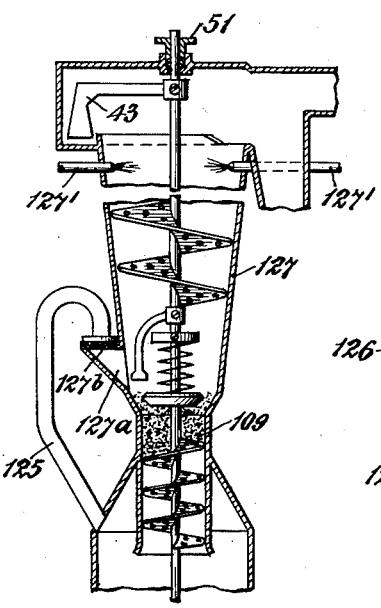
Fig. 4 is a modified form of tank for treating the extracted material with solvent vapor.
Figure 5:
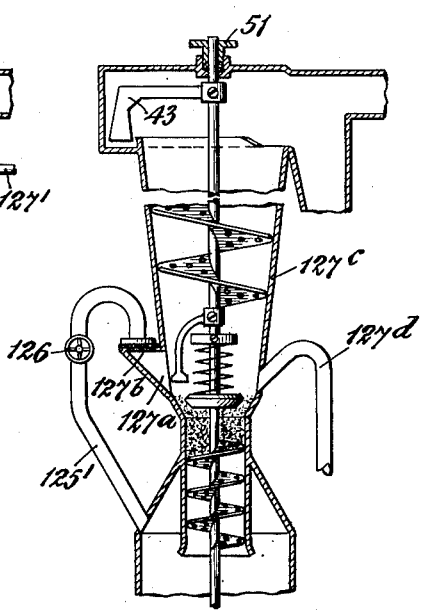
Fig. 5 is another modified view of a tank such as shown in Fig. 4.
Figure 6:
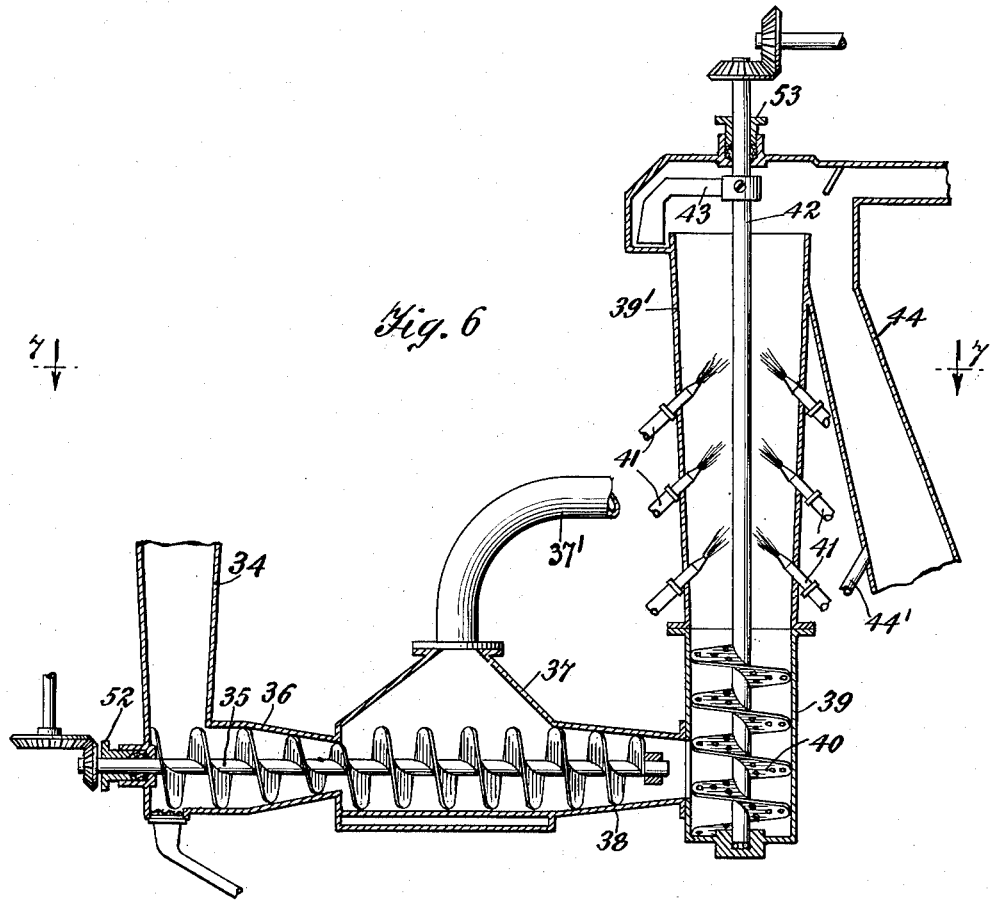
Fig. 6 is an enlarged section view of the drier and final eliminator shown in Fig. 1.
Figure 7:
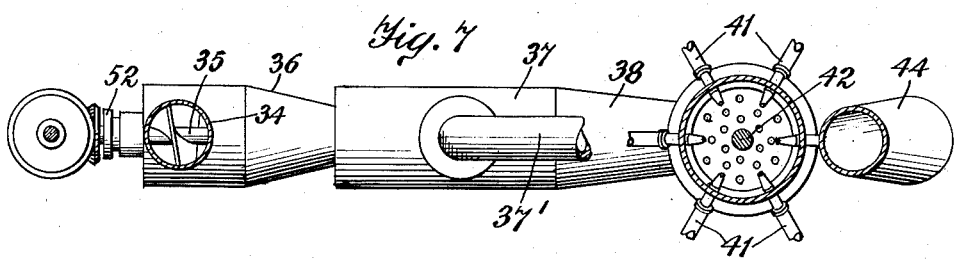
Fig. 7 is a section on the line 7—7 of Fig. 6 showing the elements illustrated in Fig. 6.

In Figs. 4 and 5 I have shown modified forms of final washing or spraying containers. In the construction shown in Fig. 4, the solvent from any suitable source of supply, not shown, is sprayed into the tank 127 by means of sprayer nozzles 127' and this solvent then passes downwardly through the material until stopped by an impermeable plug 109 and then passes by way of the elbow $127^a$ through the strainer $127^b$ into and through the main solvent spray pipe 125 to the extractors. The operation of the construction shown in said Fig. 4 in other respects is similar to that hereinabove described in relation to Fig. 1. In Fig. 5 I have shown another modified form of final washing or spraying tank $127^c$. In this construction, solvent vapor heated in any suitable manner not shown is passed through the vapor pipe $127^d$. This solvent vapor passes upwardly through the material in the tank $127^c$ and finally passes out through an elbow $127^a$ and strainer $127^b$ similar to that shown in Fig. 4 and thence through an extractor-supply pipe 125' which in view of the fact that a vapor is employed is provided with a suitable pressure regulating valve 126. In other respects this construction is similar to that described in relation to Figs. 1, 2 and 4.

A series of suitable manholes 60 are provided wherever necessary to enable access to the system.

A vent pipe $29^f$ connected to the percolator 29 is led to an absorption tower, not shown, and a vent-pipe 37' from the drier leads to a suitable condenser, not shown.

A drain pipe $20^b$ communicates with the bottom of the horizontal conduit 36 and the extractor unit 3' through which will pass any liquid solvent deposited in said conduit 36, and caused by the squeezing of material by the screw in said conduit.

The space between the screw 32 and the top of the conduit 28 is provided for the purpose of avoiding a packing of the material in this part of the apparatus, and the shafts 32' and 7 are preferably synchronized to enable a proper feeding of the material.

The pipes $6^b$ and $39^b$ carry away solvent vapor to a suitable condenser not shown.

In Fig. 8, I have shown a modified form of a series of extractors and heaters embodying my invention. In the embodiment shown in this figure of the drawings, I provide a series of three extractor tanks 130, 130' and $130^a$ which communicate with each other to permit material to be conveyed vertically therethrough and to be subjected to contact with the solvent substantially as above described in relation to Fig. 1. At the lower end, the series of tanks 130, 130' and $130^a$ communicate with a heating tank 140 into which material is fed in the same manner as hereinabove described in relation to Fig. 1, through the inclined conduit 28 having the conveyor-screw 28', which is also preferably connected at its bottom end to a percolator tank, not shown, in the same manner as shown and described in relation to Fig. 1.

The opposite or upper end of the series of extractor tanks may communicate by pipe 131 with an auxiliary solvent-evaporating tank or drier such as horizontal drier 37 shown in Fig. 1, and the material may be subsequently treated with steam in a tank such as the tank 39 hereinabove described in relation to the construction shown in Figs. 1 to 7.

The extractors 130, 130' and $130^a$ are shown as positioned vertically in close adjacency to each other and are connected through material inlet conduits or inlet passages 132 and 132' and the lowermost extractor is similarly connected with a main heating tank 140 through a conduit or passage $132^a$. These material inlet conduits or passages communicate with an adjacent extractor tank intermediate the ends and above the bottom thereof and the material first passes downwardly therethrough into the bottom of each of the extractor tanks.

In the embodiment shown in said Fig. 8 the material conveyed through the conduit 28 by the conveyor screw enters the tank 140 through the side wall thereof and drops by gravity to the bottom of said tank 140 where it is, in a manner similar to that hereinabove described, first agitated by the agitator 140' in the solution which partially fills this tank to the solvent liquid line 144, and is then conveyed vertically by the tapered screw 140ᵃ into contact with the conveyor screw 140ᵇ which closely fits the interior of the conduit 140ᶜ. The material will thus be carried upwardly by the conveyor screws in the internal tube or conduit 140ᶜ to the top end thereof which is provided with a cap 140ᵈ having an agitator or pusher 141 which forces the material into alignment with the passage 132ᵃ communicating with the lowermost extractor tank 130ᵃ, through which passage such material drops by gravity into the bottom of said lowermost extractor tank 130ᵃ. In this tank the agitator 140', conveyor screws 140ᵃ, and 140ᵇ and agitator 141 are all mounted on a vertical shaft 142 extending axially through the tank and as shown is rotated at the top of the series of tanks by means of pinions 142', 142ᵃ from a horizontal shaft 143 which is rotated from any suitable source of power not shown.

In the system or series of tanks shown in Fig. 8, the liquid level is preferably maintained at or about line 144 and said tank is provided with steam chests 145, 145' or any other suitable means of applying heat to the material and solvent solution in said tank 140, and the inclined conduit 28 is likewise provided with a steam jacket 28ᵃ all similar to that hereinabove described in relation to Fig. 1. The heat applied to the tank 140 is preferably sufficient to bring the solvent solution to the boiling point and thus to drive off vapors through the pipe 146, which vapors are subsequently condensed in an auxiliary condenser 147 and thereafter led through pipes 148, 148' into the cap 140ᵈ of the heating tank 140 and also into a vapor pipe 133 connected with the vertically disposed extractor 130ᵃ. The pipes 148, 148' are preferably provided with regulating valve elements 149, 149' to regulate the flow of solvent through the two pipes 148, 148' into the said lower extractor and to the heating tank respectively. The condenser 147 is connected at its upper end with a pipe 147' which extends to a main condenser, not shown, so that any vapor remaining uncondensed in the small or auxiliary condenser 147 will pass upwardly through this pipe 147' to such main condenser where they will be fully condensed and used to supply solvent to the various extractor units or other units of the system.

It will be understood that liquid vapor passes downwardly from the condensers 147, 147ᵃ through the pipes 148, 148' into the lower parts of pipes or conduits 133, 133' which are large enough to permit liquid solvent to pass downwardly therethrough into the tanks while also functioning to permit solvent in vapor form to pass upwardly therethrough from the tanks to the condensers.

The material passing into the lowermost extractor tank 130ᵃ is agitated by the agitator 134 mounted in the lower end of the tank, is then carried upwardly by the tapered conveyor 135 into contact with the straight conveyor 136 which is arranged in a tube or conduit 137, the material thus being conveyed through this conduit 137 to the upper end thereof by the conveyor screws which are mounted upon the vertically disposed axially positioned shaft 138. A cap 139 is connected with the upper end of the tube 137 and within this cap is located an agitator or pusher member 141' which forces the material into passage 132' communicating with an intermediate vertically disposed extractor 130' from which it is passed in the same manner to an upper vertically disposed extractor 130, said extractor 130' being provided with a similar agitator 134' a similar tapered screw 135', a similar straight conveyor screw 136', a similar tube 137', a similar vertically disposed shaft 138', a similar cap 139' having a similar pusher or agitator 141ᵃ. The conveyance of the material into said extractor 130 similarly causes the material to drop through the passage 132 into the bottom of the tank 130, to be agitated therein by agitator 134ᵃ, then conveyed upwardly by screws 135ᵃ, 136ᵃ all mounted on the shaft 138ᵃ, through the tube 137ᵃ to the cap 139ᵃ where the material is forced by the agitator or pusher 141ᵇ into the passage 150 between the upper extractor and the pipe 131, which material may thereafter be treated as hereinafter specified in relation to Fig. 1.

The solvent, which as aforesaid is preferably gasoline, is fed through the main supply pipe 151, having a regulating valve 151' into the extractor 130. The material being conveyed through this extractor will thus be subjected to the solvent fed through the pipe 151. This solvent, preferably after being heated initially as for example in a solvent-heating tank 5 or by means of heaters such as 33 or both, such, as hereinabove described in relation to Fig. 1, is fed through the pipe 151 and will gradually fill the tank 130 so that the material being conveyed therethrough will be subjected to a periodic bath of such heated solvent.

This bath of solvent is periodically removed or discharged from the tank 130, and in the embodiment shown, the tank is emptied preferably by means of a siphoning mechanism when the solvent reaches a predetermined level in such tank. As illustrated, the bottoms of the several tanks are provided with filters or filtering compartments 152, 152', 152ᵃ and these filtering compartments are connected with siphoning columns 153, 153' and 153ᵃ which extend upwardly a predetermined distance and then communicate with the discharge pipes 154, 154' and 154ᵃ which communicate with the next lower extractor. The connections between the filters and the discharge pipes are preferably provided with sight glasses 155, 155', and 155ᵃ in the same manner as hereinabove described, and each siphoning column is also provided with a by-pass pipe 156, 156', 156ᵃ, said by-pass pipes having regulating valves 157, 157' and 157ᵃ for the same purpose as hereinabove described in relation to Fig. 1. Solvent vapors from the tanks 130ᵃ and 130' are condensed in the condensers 147ᵃ and 147ᶜ and treated as hereinabove described and vapor from the tank 130 will obviously be similarly treated. In the embodiment shown in Fig. 8 the shafts 138, 138' and 138ᵃ are all rotated by the shaft 143, said shafts 138, 138' being provided with bevelled pinions while the shaft 143 is provided with intermeshing bevelled pinions 143' and 143ᵃ. The shaft 138ᵃ of the extractor 130 is similarly rotated.

Obviously, in the construction shown in Fig. 8 the material conveyed through the several extractors will be subjected to periodic baths of solvent, and the time period of filling the upper extractor tank may be regulated by the regulating valve 151' in the main supply pipe 151, and the time period of contact between the solvent and material may be fixed in each of the extractors by the siphoning mechanism and this time period for each unit may be further regulated by the use of the by-pass conduits and regulating valves thereof, all as hereinabove specified in relation to Fig. 1.

Operation of the process and apparatus will be obvious from the above description.

It will be understood that it is desirable after each operation of extraction to discharge from such material the solvent which has been used in that extraction in order to permit quick contact with new solvent in the succeeding extraction, it being understood that when flaked material which is saturated with solvent is subjected to new solvent, it takes a long time for the fresh solvent to replace the used solvent. Where the material is capable of withstanding the necessary pressure without pulverizing, I therefore, preferably squeeze such material after each extraction to express the solvent which is richer in oil and avoid employment of such solvent in the succeeding tanks which contain material less rich in oil. In this manner, I enable solvent in a given tank to have speedier access into the tissue of the material without first replacing older solvent in such material, and I avoid intermingling of the solvent in one tank with the solvent in another tank, thus dissolving more oil in a given time period, because the concentration of solvent in a given tank is always higher or lower than that in a preceding or succeeding tank. In using certain kinds of material, however, a squeezing of the material would result in pulverization, and in treating such materials I preferably convey the materials in a vertical direction for a suitable distance to permit discharge of the used solvent and contained oil by a dripping action instead of the squeezing action hereinabove described and used solvent in such material is at or near the end of the dripping action and before being carried over into the next unit replaced by fresh solvent. As shown, I use vertical conveyor screws with a relatively long travel and this dripping action which is intended to avoid the passing over into the next tank of the solution of that tank is preferably assisted by a washing action of fresh solvent injected at the top of the container as for example by an addition of solvent through the pipes 148' and 148ª with valves 149 and 149'. Fresh liquid solvent, recovered in the condensers is added without diluting the solvent in the washing part or section of the system, and this will avoid carrying solution over with the material to the next unit and will keep such solution down toward the solution outlet. In other words, for example, it is obviously desirable to prevent the solution in the tank 130ª from entering tank 130' and we therefore wash the material to free it from such solution before permitting it to pass over, thus causing such solution to be held back toward its outlet and to avoid, as far as possible, extracted oil from following the path of the material through the system. In this apparatus, the diffusion action is continued during vertical conveyance because of the spraying of fresh solvent at the top from pipes such as 148', 148ª.

It will be understood furthermore that by my invention and the regulation of the time periods hereinabove specified and the consequent regulation of the oil extraction great economy in the quantity of solvent required and in the economy of subsequent operations of recovery of oil therefrom may be accomplished.

Having described my invention, I claim:

1. In a continuous extraction system, the process of continuously removing from solvent-treated materials, solvent of lower specific gravity than such materials, comprising the continuous conveyance, in an upward direction, through a plurality of superposed steam-injection zones, of material containing traces of solvent, the subjection of such material in such zones during such movement thereof to the solvent-entraining action of jets of steam, said steam jets being heated progressively and increased to higher degrees of temperature for each successive zone above the preceding zone, beginning at the lowermost zone and rising upwardly, whereby successive particles of solvent are entrained at successively higher zones, the continuous discharge of solvent-exhausted material, and the continuous carrying off of steam and entrained solvent above the discharged material.

2. In a continuous extraction system, the process of continuously removing from solvent-treated materials, solvent of lower specific gravity than such materials, comprising the continuous conveyance, in a true vertical direction, through a plurality of superposed steam-injection zones, of material containing traces of solvent, the subjection of such material in such zones during such movement thereof to the solvent-entraining action of jets of steam, said steam jets being heated progressively and increased to higher degrees of temperature for each successive zone above the preceding zone, beginning at the lowermost zone and rising upwardly, whereby successive particles of solvent are entrained at successively higher zones, the continuous discharge of solvent-exhausted material, and the continuous carrying off of steam and entrained solvent above the discharged material.

MICHELE BONOTTO.